United States Patent [19]
Ward

[11] Patent Number: 5,662,090
[45] Date of Patent: Sep. 2, 1997

[54] HEAT EXCHANGE SYSTEM FOR USING VEGETABLE OILS AS AN ENGINE FUEL

[76] Inventor: Jackie L. Ward, 4384 N. Oceanshore Blvd., Palm Coast, Fla. 32137

[21] Appl. No.: 723,579

[22] Filed: Oct. 1, 1996

[51] Int. Cl.$^6$ ................................................ F02M 31/16
[52] U.S. Cl. ........................................................ 123/557
[58] Field of Search ........................... 123/557, 549, 123/179.21, 545, 546, 547

[56] References Cited

U.S. PATENT DOCUMENTS

| | | | |
|---|---|---|---|
| 4,237,850 | 12/1980 | Connor et al. | 123/557 |
| 4,286,551 | 9/1981 | Blitz | 123/557 |
| 4,562,820 | 1/1986 | Jiminez | 123/557 |
| 4,726,346 | 2/1988 | Lucht | 123/557 |
| 4,807,584 | 2/1989 | Davis | 123/557 |
| 4,865,005 | 9/1989 | Griffith | 123/557 |
| 4,926,830 | 5/1990 | McNelley | 123/557 |
| 4,964,376 | 10/1990 | Veach | 123/557 |
| 5,029,634 | 7/1991 | Hurner | 123/557 |

*Primary Examiner*—Marguerite McMahon
*Attorney, Agent, or Firm*—Arthur G. Yeager

[57] ABSTRACT

A fuel tank heat exchanger receives hot water from a vehicle diesel engine for the heating of vegetable oils that are used as engine fuel. An electrically-operable shunt valve is installed in the water line from the engine to the radiator to direct hot water from the engine to the heat exchanger and then to the radiator or to the radiator only in order to provide adequate cooling of the engine and to prevent excessive heating of the fuel oil. Temperature sensing of the fuel oil is used to provide information for operating the shunt valve. The system also includes a fuel heat exchanger wrapped around the vehicle exhaust pipes and water and fuel preheaters for additional heating particularly for initial starting of the engine in cold climates.

17 Claims, 2 Drawing Sheets

HEAT EXCHANGE SYSTEM FOR USING VEGETABLE OILS AS AN ENGINE FUEL

BACKGROUND OF THE INVENTION

1. Field of the Invention

The present invention relates to apparatus used to heat fuel oils, particularly vegetable oils used as fuel in diesel engines.

2. Prior Art

Fuel heating systems and apparatus are well known to the prior art. An example of such a system is U.S. Pat. No. 4,748,960. The system discloses a method for simply turning off the heating apparatus when the temperature obtained is deemed satisfactory. Greater control of temperature than exists in the prior art is necessary due to the wide variations in vegetable oil quality and viscosity and due to wide variations in temperatures that are attained in various regions of vehicle use.

SUMMARY OF THE INVENTION

In one aspect of the present invention there is provided a method of regulating the temperature of a viscous fuel in a fuel tank that is supplied to a diesel engine that is cooled by directing water from the engine to a radiator including the steps of providing a heat exchanger mounted inside the fuel tank for receiving hot water from an engine; and selectively directing the hot water from the engine to the heat exchanger for heating the fuel in the fuel tank when the temperature of the fuel in the tank is below a predetermined temperature range. This latter step includes selectively directing the hot water from the engine directly to either the heat exchanger or to the radiator. The method includes heating water in the radiator when the engine is not operating; and circulating the hot water in the radiator to the engine and to the heat exchanger for heating the engine and the fuel in the fuel tank when the engine is not operating; sensing the temperature of the fuel in the fuel tank; sensing the temperature of the fuel at a point in the fuel line between the fuel tank and the entry of the fuel into the engine; selectively directing the hot water in response to the temperature measured; and returning the water from the heat exchanger to the radiator.

Other aspects of the present invention include a system for regulating the temperature of viscous fuel from a fuel tank that is supplied to a diesel engine that is cooled by directing water from the engine to a radiator comprising a heat exchanger for heating fuel in the fuel tank, piping means for connecting the heat exchanger to the engine and to the radiator selectively operable valve means connected between the radiator and the heat exchanger for selectively directing hot water leaving the engine alternately to the radiator or to the heat exchanger. The heat exchanger is located within a fuel tank. Also included is heating means for heating the water in the radiator, engine and the heat exchanger when the engine is not operating, the heating means including AC electric heater means for heating water and pump means for directing water heated by the heater means through the radiator, the engine, and the heat exchanger to heat fuel in the fuel tank. The piping means includes engine inlet and outlet pipes, the radiator having inlet and outlet pipes and the heat exchanger having inlet and outlet pipes, the engine outlet pipe being connected to the radiator inlet pipe and the radiator outlet pipe returning cooled water to the engine inlet pipe, the exchanger inlet pipe being connected to the engine outlet pipe, the exchanger outlet pipe being connected to the radiator inlet pipe, the selectively operable valve means being connected to the engine outlet pipe and the radiator inlet pipe for selectively directing water from the engine to the heat exchanger or to the radiator for regulating heating of fuel in the fuel tank by the heat exchanger.

Further aspects of the invention include a second heat exchanger including a length of fuel line pipe from the fuel tank to the engine being wrapped around the exhaust pipe of the engine. Also included in the invention is sensing means for measuring the temperature of the fuel and indicating means operably connected to the sensing means for providing visual indication of the temperature sensed by the sensing means. The sensing means includes a temperature sensor for measuring the temperature of fuel in the fuel tank and a second temperature sensor for measuring the temperature of the fuel between the fuel tank and the engine. There is also valve operating means operably connected to the selectively operable valve means for operating the selectively operable valve means in response to the temperature of the fuel measured by the sensing means.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE PREFERRED EMBODIMENT

Figure 1:
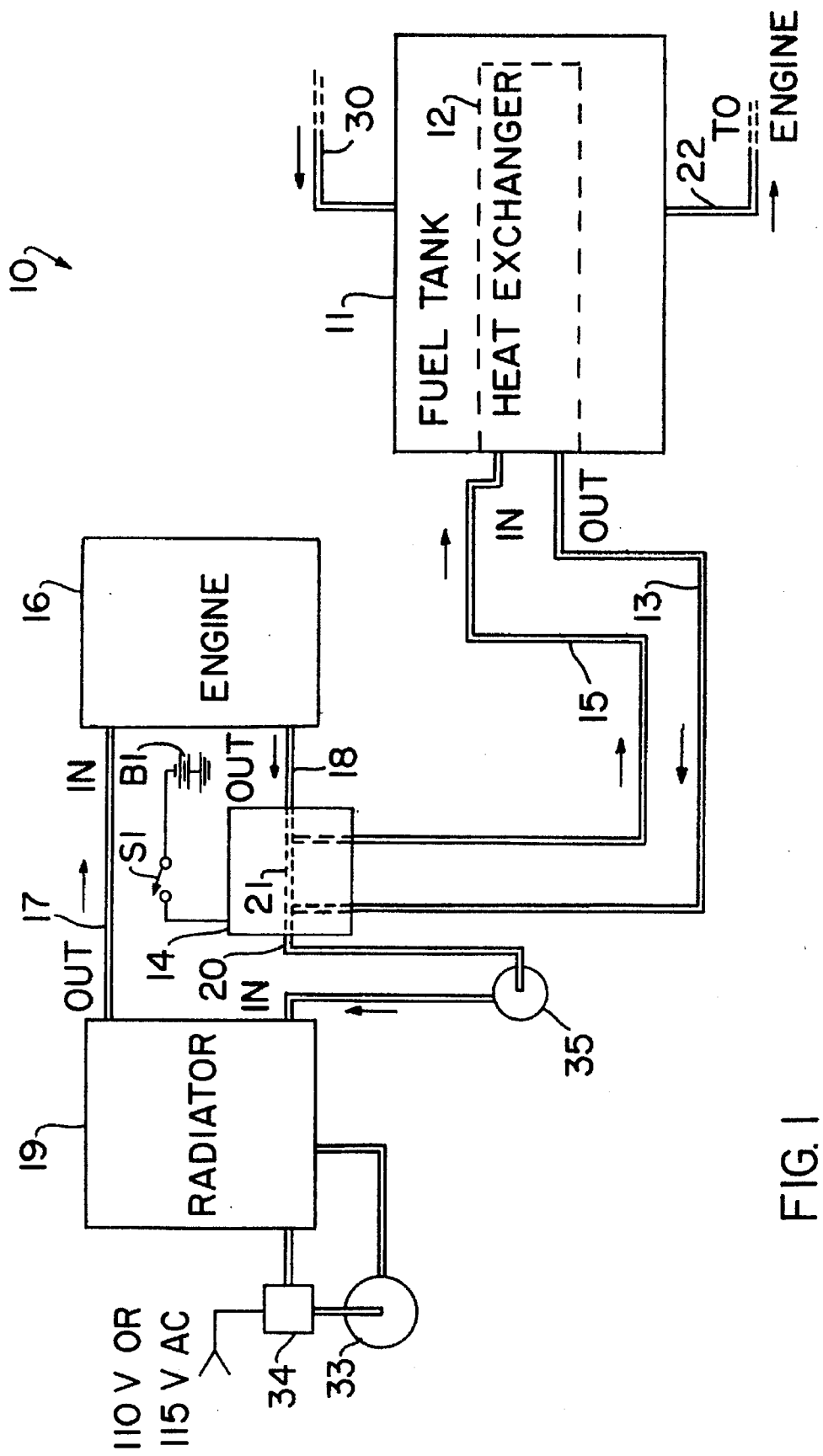
FIG. 1 is a diagram of the engine and fuel tank temperature control and heat exchange system in accord with the present invention.

Referring now to the drawings, the temperature control and heat exchange system for heating fuel oil is depicted at the numeral 10 in FIG. 1. The fuel tank 11 of a motor vehicle includes a heat exchanger 12 preferably located therein that receives hot water at inlet connection 15 and returns the cooler water via a return line 13. Electrically controlled shunt valve means 14 is operated via switch S1 to provide water leaving diesel engine 16 via line 18 to heat exchanger 12 via line 15 or can shunt the water at line 18 to the radiator 19 via valve 14 path designed at 21 to inlet 20. Air-cooled radiator water is returned to engine 16 via line 17 and is directed by standard water pump 19'. Water pump 33 and associated electric preheater 34 are used to provide heating to the engine 16 in cooler climates particularly for cold starting by circulating heated water out from radiator outlet 17. It is to be understood that other engine preheaters and circulation paths are known to the art and can be used if desired.

Heat exchanger 12 can be of any known design adequate under the circumstances and is used to heat the vegetable oil fuel in tank 11 in order to lower the viscosity of the fuel and improve engine efficiency. Switch S1 is operable manually from the vehicle's driver compartment but can be controlled automatically via temperature sensing and control circuitry as is well known in the art for fuel and engine temperature control. The switch S1 is connected to vehicle battery B1.

Figure 2:
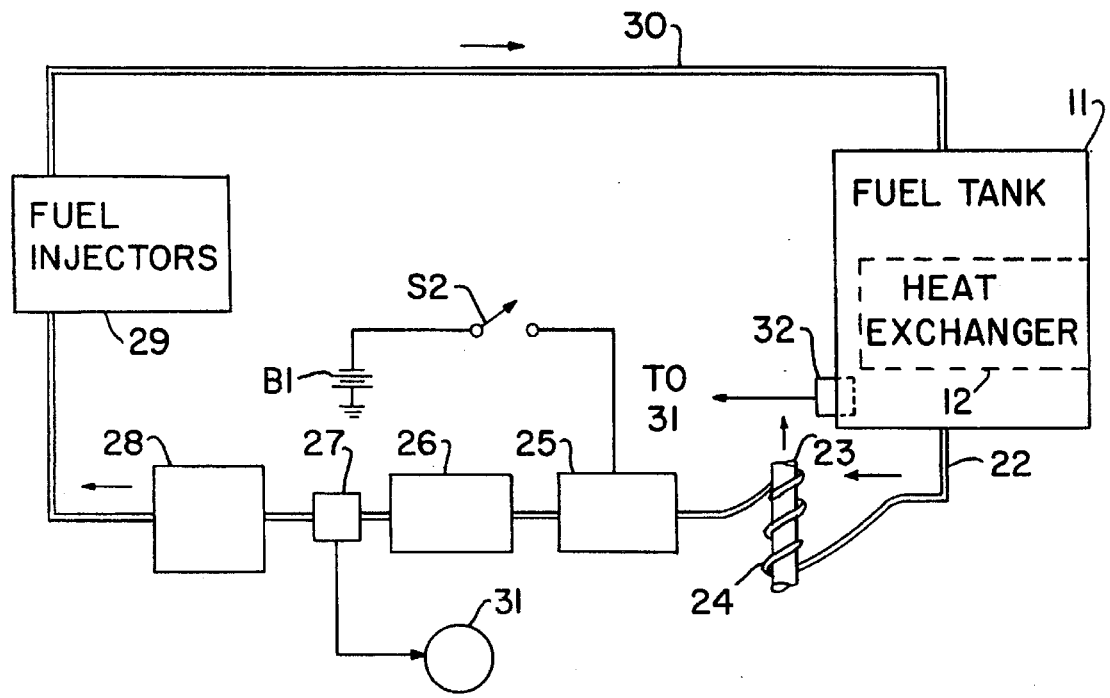
FIG. 2 is a diagram of the heat exchange system for the engine fuel in accord with the present invention.

FIG. 2 illustrates the fuel oil system that directs fuel from tank 11 via an outlet fuel line 22 to a heat exchanger 24 that is formed by wrapping the metal fuel line around the exhaust piping 23 from the engine 16 of the vehicle. Additional heating is available by locating the metal line in close proximity to the engine exhaust manifold. Fuel is then directed to an electric preheater 25, powered by the vehicle electrical circuit via battery B1, to fuel filter 26 and then to fuel injection pump assembly 28. Temperature sensors 27 and 32 provide outputs to temperature readout panel or device 31 located in the driver's compartment to permit the driver to manually operate S1 to control fuel and engine temperature. Fuel injectors 29 provide fuel to the engine 16 and un-injected fuel is returned to fuel tank 11 via return line 30.

An important feature of the present invention is use of electric shunt valve 14 to regulate temperature of the fuel oil in combination with the heating apparatus. This system will allow the operator to shunt hot water to the radiator 19 should the fuel temperature get too high.

Preheater 25 and filter 26 are optional items that may be used if the fuel consists of discarded vegetable oil that may, for example, be supplied from restaurants. Such fuel may be of higher viscosity and also "dirtier" than the more highly refined oil from an agriculture-based source.

The present invention is directed to the use of vegetable oils of various grade and quality for use in standard diesel engines that are used for example in large trucks and buses. Such vehicles may include fuel preheater 25 and radiator preheater 34 and pump 33. This apparatus is often supplied for vehicles operable in colder climates and may be employed with other engine heating apparatus known to the art.

Wrap around heat exchanger 24 is mounted on the vehicle exhaust pipe 23 which is often mounted vertically and in proximity to one or more fuel tanks 11.

Figure 3:
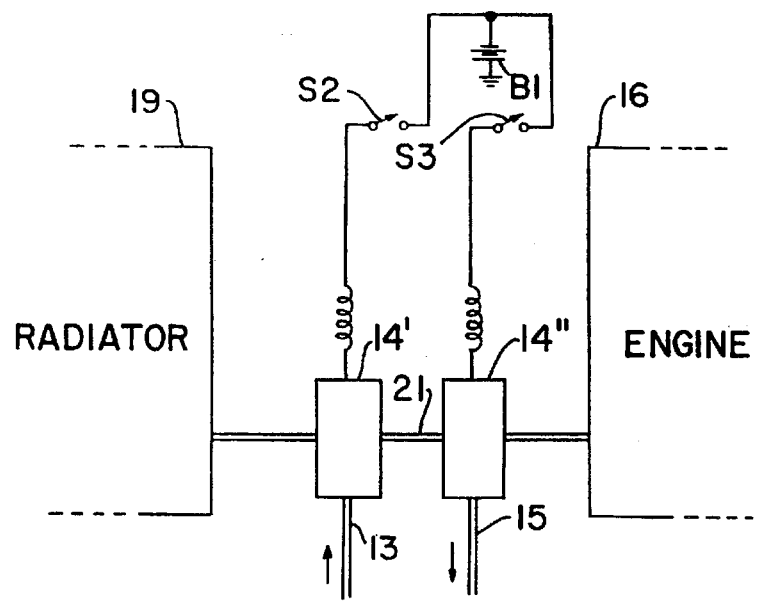
FIG. 3 is a simplified diagram of an alternative embodiment of the shunt valve of FIG. 1.

Shunt valve means 14 is illustrated as a single multi-port valve that is understood in the art. It is to be understood in the art. It is to be understood that shunt valve means 14 may be more than one valve operable in unison to redirect water flow. This particular alternative embodiment is depicted in FIG. 3 which illustrates a pair of solenoid valves 14' and 14" connected to switches S2 and S3. Both valves 14' and 14" are operable manually or automatically and simultaneously open or closed to control water direction and engine 16 and fuel temperature.

Finally, water is directed through radiator 19, engine 16, and heat exchanger 12 via a standard water pump 35 which may be physically located at any point that is appropriate depending upon the specific layout of the engine cooling system in a particular vehicle. Pump 35 is shown at inlet pipe 20 for purposes of illustration.

While the invention has been described with respect to certain specific embodiments it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method of regulating the temperature of a viscous fuel in a fuel tank that is supplied to a diesel engine that is cooled by directing water from the engine to a radiator including the steps of:

A. providing a heat exchanger mounted inside the fuel tank for receiving hot water from an engine; and B. selectively directing the hot water from the engine to the heat exchanger for heating the fuel in the fuel tank when the temperature of the fuel in the tank is below a predetermined temperature range.

2. The method of claim 1 further including the steps of:

C. heating water in the radiator when the engine is not operating; and

D. circulating the hot water in the radiator to the engine and to the heat exchanger for heating the engine and the fuel in the fuel tank when the engine is not operating.

3. The method of claim 1 further including the step of:

C. wrapping a fuel line from the fuel tank to the engine about the exhaust pipe from the engine for heating fuel in the fuel line when the engine is operating.

4. The method of claim 1 further including the step of:

C. sensing the temperature of the fuel in the fuel tank.

5. The method of claim 1 further including the step of:

sensing the temperature of the fuel at a point in the fuel line between the fuel tank and the entry of the fuel into the engine.

6. The method of claim 1 wherein step B includes the steps of:

i. measuring the temperature of the fuel; and ii. selectively directing the hot water in step B in response to the temperature measured in step i.

7. The method of claim 1 further including the step of:

C. returning the water from the heat exchanger to the radiator.

8. The method of claim 7 wherein step B includes the step of selectively directing the hot water from the engine alternately to the heat exchanger and through a return from the heat exchanger to the radiator or to the radiator directly.

9. A system for regulating the temperature of viscous fuel from a fuel tank that is supplied to a diesel engine, that is cooled by directing water from the engine to a radiator, comprising a heat exchanger for heating fuel in the fuel tank, piping means for connecting said heat exchanger to the engine and to the radiator, selectively operable valve means connected between the radiator and said heat exchanger for selectively directing hot water leaving the engine alternately to the radiator or to said heat exchanger.

10. The system as defined in claim 9 wherein said heat exchanger is located within a fuel tank.

11. The system as defined in claim 9 further including heating means for heating the water in the radiator, engine and said heat exchanger when the engine is not operating, said heating means including AC electric heater means for heating water and pump means for directing water heated by said heater means through the radiator, the engine, and said heat exchanger to heat fuel in the fuel tank.

12. The system of claim 9 wherein said piping means includes engine inlet and outlet pipes, said radiator having inlet and outlet pipes and said heat exchanger having inlet and outlet pipes, said engine outlet pipe being connected to said radiator inlet pipe and said radiator outlet pipe returning cooled water to said engine inlet pipe, said exchanger inlet pipe being connected to said engine outlet pipe, said exchanger outlet pipe being connected to said radiator inlet pipe, said selectively operable valve means being connected to said engine outlet pipe, said radiator inlet pipe, and said heat exchanger inlet pipe for selectively directing water from the engine to said heat exchanger or to the radiator for regulating heating of fuel in the fuel tank by said heat exchanger.

13. The system as defined in claim 9 further including a second heat exchanger means for heating fuel from the fuel tank, said second heat exchanger including a length of fuel line pipe from the fuel tank to the engine being wrapped around the exhaust pipe of the engine.

14. The system as defined in claim 9 further including sensing means for measuring the temperature of the fuel and indicating means operably connected to said sensing means for providing visual indication of the temperature sensed by said sensing means.

15. The system as defined in claim 14 wherein said sensing means includes a temperature sensor for measuring the temperature of fuel in the fuel tank.

16. The system as defined in claim 15 further including a second temperature sensor for measuring the temperature of the fuel between the fuel tank and the engine.

17. The system as defined in claim 14 further including valve operating means operably connected to said selectively operable valve means for operating said selectively operable valve means in response to the temperature of the fuel measured by said sensing means.

* * * * *